US012663432B2

(12) United States Patent (10) Patent No.: US 12,663,432 B2
Mahllati et al. (45) Date of Patent: Jun. 23, 2026

(54) TEST SYSTEM FOR A PLURALITY OF SEPARABLE TEST OBJECTS

(71) Applicant: LAW-NDT Mess- und Prüfsysteme GmbH, Schiesheim (DE)

(72) Inventors: Hamid Reza Shojaei Mahllati, Wiesbaden (DE); Christoph Kaiser, Herold (DE)

(73) Assignee: LAW-NDT Mess- und Prüfsysteme GmbH, Schiesheim (DE)

( * ) Notice: Subject to any disclaimer, the term of this patent is extended or adjusted under 35 U.S.C. 154(b) by 312 days.

(21) Appl. No.: 18/559,163

(22) PCT Filed: Apr. 28, 2022

(86) PCT No.: PCT/EP2022/061285
§ 371 (c)(1),
(2) Date: Nov. 6, 2023

(87) PCT Pub. No.: WO2022/233686
PCT Pub. Date: Nov. 10, 2022

(65) Prior Publication Data
US 2024/0241145 A1 Jul. 18, 2024

(30) Foreign Application Priority Data
May 6, 2021 (DE) .................... 10 2021 111 837.9

(51) Int. Cl.
*G01N 35/04* (2006.01)
*G01M 13/00* (2019.01)
*G01N 35/00* (2006.01)
(52) U.S. Cl.
CPC ....... *G01N 35/04* (2013.01); *G01N 35/00732* (2013.01); *G01N 35/00871* (2013.01);
(Continued)

(58) Field of Classification Search
CPC ............................... G01N 35/04; G01M 13/00
See application file for complete search history.

(56) References Cited

U.S. PATENT DOCUMENTS

2002/0106305 A1* 8/2002 Willenbring ........... G01N 35/04
422/65
2010/0252203 A1* 10/2010 Kim ................. G01N 35/00732
156/538
2015/0377796 A1* 12/2015 Schlezinger ....... G01N 21/6489
356/72

FOREIGN PATENT DOCUMENTS

DE 112005001751 T5 5/2007
DE 102018201204 A1 8/2019

OTHER PUBLICATIONS

International Preliminary Report on Patentability issued on Oct. 24, 2023, in corresponding International Application No. PCT/EP2022/061285, 13 pages.
(Continued)

*Primary Examiner* — Stephanie E Bloss
*Assistant Examiner* — Diana Hancock
(74) *Attorney, Agent, or Firm* — Maier & Maier, PLLC

(57) ABSTRACT

A test system for a plurality of separable test objects, including a feeding device for the plurality of test objects, a conveying device with a conveying path for the plurality of test objects, a test station for inserting a test unit, an ejection device, a data transmission device and a first data interface. The feeding device is arranged and located in such a way that the plurality of test objects can be fed to the conveying device at a feeding position by the feeding device during operation of the test system. The test station is located at a testing position on the conveying path in a conveying direction downstream of the feeding position. The test station is arranged so that the test unit can be interchangeably connected to the test station, and the ejection device is
(Continued)

located on the conveying path in the conveying direction downstream of the testing position.

12 Claims, 4 Drawing Sheets

(52) U.S. Cl.
    CPC ... *G01M 13/00* (2013.01); *G01N 2035/00831* (2013.01); *G01N 2035/00881* (2013.01); *G01N 2035/0465* (2013.01); *G01N 2035/0491* (2013.01)

(56)                References Cited

OTHER PUBLICATIONS

International Search Report and Written Opinion issued on Sep. 2, 2022, in corresponding International Application No. PCT/EP2022/061285, 17 pages.
German Office Action issued on Jan. 26, 2022, in corresponding Application No. 10 2021 111 837.9 12 pages.

* cited by examiner

TEST SYSTEM FOR A PLURALITY OF SEPARABLE TEST OBJECTS

FIELD

The present invention relates to a test system for a plurality of test objects which can be separated, comprising a feeding device for the plurality of test objects, a conveying device with a conveying path for the plurality of test objects, a test station for inserting a test unit, an ejection device, a data transmission device and a first data interface, wherein the feeding device is arranged and located in such a way that the plurality of test objects can be fed to the conveying device at a feeding position by the feeding device during operation of the test system, wherein the testing station is located at a testing position on the conveying path in a conveying direction downstream of the feeding position, wherein the testing station is arranged in such a way that the test unit can be interchangeably connected to the testing station, and wherein the ejection device is located on the conveying path in the conveying direction downstream of the testing position at an ejection position and is arranged in such a way that during operation of the test system at least one of the plurality of test objects can be ejected from the conveying device by means of the ejection device, and wherein the data transmission device for information transmission is operatively connected at least to the ejection device and the first data interface.

The present invention further relates to a test unit insertable into a test station of a test system, comprising a test controller and a second data interface connected to the test controller, wherein the second data interface is connectable to a first data interface of the test system for data exchange.

BACKGROUND

Prior art test systems for the testing of test objects produced in large numbers and capable of being separated are known for a wide variety of applications in industrial quality control. The aim is to test a large number of test objects completely in as short a time as possible, i.e. within the framework of a 100% test. For this purpose, the test objects, which are originally in the form of a bulk material, must first be separated and then located in such a way that each of the test objects can be tested individually and reproducibly. Therefore, prior art test systems for separable test objects are known which comprise a conveying device in the form of a turntable. The turntable has a plurality of slot-shaped receptacles along its outer circumference, in each of which a test object is guided. It has been shown that the test systems known from the prior art are inflexible with respect to their functionalities, but also, for example, with respect to their fail-safety. It is therefore an object of the present invention to provide a test system comprising increased flexibility.

SUMMARY

This object is solved by a test system. To solve this object, a test system of the type mentioned above further comprises an identifier which uniquely identifies the testing position of the test station, wherein the identifier is coded in such a way that the identifier can be read by the test station when the test unit is inserted into the test station.

The basic idea of the present invention is to provide the test units in the form of interchangeable modules. The respective test unit can be inserted into the test system at the test station. In this way, a test unit comprising a first functionality can be exchanged for a test unit comprising a second functionality. The same test unit can then be used for different testing tasks. The solution according to the invention also makes it possible to provide a plurality of test stations at a plurality of testing positions in a test system. By exchanging one or more of the plurality of test units or by changing a sequence of the plurality of test units, it is then possible to implement freely configurable test sequences in one and the same test system.

According to the invention, a test unit reads the identifier that uniquely identifies the testing position when it is inserted into a testing station of the test system. Preferably, this is done automatically, wherein the readout process does not have to be triggered separately by an operator. After reading the identifier, the test unit knows in which testing station and thus at which testing position of the existing test system it is located. This is the key to a number of possible embodiments of a flexible test system.

In an embodiment of the invention, the test system comprises a plurality of testing stations at a plurality of testing positions along the conveying path in the conveying direction downstream of the feeding position. In such an embodiment, the test system comprises a plurality of identifiers, each of which uniquely identifies precisely one testing position of a testing station, wherein each identifier is coded in such a way that the respective identifier can be automatically read by the test unit when a test unit is inserted into the respective testing position.

In an embodiment of the invention, the test system comprises a plurality of feeding devices at a plurality of feeding positions. In this way, it is possible to feed different types or test objects to the same test section. In particular, in addition to the actual test objects from the current production, defective parts can be fed in at definable times in order to subject the system to a tolerance measurement or test. Also, in an embodiment, a plurality of feeding devices enables the realisation of a plurality of test sections in the same test system, comprising only one conveying device.

In an embodiment of the invention, the test system comprises a plurality of ejection devices at a plurality of ejection positions. By having a plurality of ejection devices, it is possible to sort the test objects as they are ejected from the test system based on the test result.

In an embodiment of the invention, the identifier is encoded in an identifier device located in an embodiment of the test station and readable by the test unit.

A possible example of such an identifier device is an RFID chip, which is readable by an RFID reader of the test unit, or a QR code, which is readable by a QR code reader of the test unit.

In an embodiment of the invention, the identifier device is formed by a plug connector located at the test station. In an embodiment, the plug connector thereby preferably comprises a plurality of contact pins or contact sockets, wherein the arrangement of the contact pins or contact sockets present and/or connected to a connecting line encodes the identifier.

For example, in an embodiment the connector comprises an arrangement of n×m contact sockets, wherein n and m denote integers. However, only a characteristic pattern of these n×m contact sockets is provided with a connecting line. Thus, by detecting which contact sockets are contacted, the test unit can identify which occupancy pattern the contacts of the connector show and thus clearly identify at which test station the test unit is located.

One way to encode the identifier for the testing position is to use elements of the first data interface to encode the identifier.

It is therefore understood that such a plug connector located at the test station in an embodiment also forms part of the first data interface. Data is then transferred from the test system to the test unit and vice versa via this connector of the first data interface. Therefore, in an embodiment, the first data interface comprises a plug connector located at the test station, wherein the plug connector of the first data interface is connectable to a complementary plug connector of the test unit.

In a further embodiment, the data transmission device is a TCP/IP data network. In an embodiment, the first data interface thereby comprises a switch comprising a unique IP address or comprising a plurality of ports each comprising a unique IP address. In an embodiment, such a switch is assigned to exactly one test station, so that its IP address forms the identifier of the testing position of this test station. In an alternative embodiment, one port of a switch, each comprising its own IP address, is assigned to exactly one test station. It is understood that in an embodiment comprising a plurality of test stations, exactly one switch or exactly one port of a switch with a unique IP address is assigned to each test station. If one connects the test unit in such an embodiment comprising such a switch, the test unit reads the IP address and thus obtains knowledge about the testing position of the test station into which it has been inserted.

Thus, in an embodiment of the invention, the identifier is encoded as the IP address of the first data interface.

In an embodiment of the invention, the first data interface is a wireless interface, for example a WLAN or Bluetooth interface. Since in such an embodiment there may be no plug connector provided at the respective test station, in such an embodiment the identifier is encoded, for example, in an RFID chip or a QR code at the test station.

A data transmission device within the meaning of the present application comprises any system suitable for transmitting data between the elements of the test system connected to the data transmission device, which enables data or information to be exchanged between the elements connected to the data transmission device. Examples of such a data transmission device are a BUS and an IP-based data network.

The data transmission device of the test system according to the invention is at least connected to the ejection device and the first data interface, so that in this minimal configuration it is possible to transmit an ejection command from the test unit, which is connectable to the first data interface, to the ejection device.

In another embodiment, not only are one or more test units interchangeable and freely configurable at the test stations, but the same modular concept is also implemented for the ejection device and/or the feeding device.

Therefore, in an embodiment, the test system further comprises an ejection station and an identifier that uniquely identifies the ejection position. In this case, the ejection station is arranged in such a way that the ejection device is interchangeably inserted into the ejection station, wherein a first data interface is provided at the ejection station, which is connected to a second data interface of the ejection device, wherein the data transmission device for information transmission is operatively connected to the ejection device via the first data interface and the second data interface, wherein the identifier is encoded in such a way that the identifier can be read out by the ejection device when the ejection device is inserted into the ejection station, and wherein the ejection device comprises a reading device for reading out the identifier.

It is understood that the first and second data interfaces, the identifier and the reading device for the ejection station and the ejection device, respectively, may be arranged as described above for the test station and the test unit.

In an embodiment of the invention, the test system comprises a system controller connected to the data transmission device. In an embodiment, the system controller is a computer.

In an embodiment, such a system controller performs only administrative tasks for the operation of the test system, but not the control of the test and the subsequent sorting of the test objects. In an embodiment of the invention, the system controller is arranged such that it does not generate any ejection commands, by means of which an ejection of a test object at the ejection device could be triggered.

In an embodiment of the invention, the system controller is responsible for controlling the conveying device, for example setting or controlling the velocity of moving the plurality of test objects along the conveying device path.

In another embodiment of the invention, the system controller is used to detect and/or collect error messages from the individual devices of the test system and/or to signal such errors to an operator.

At least one of the aforementioned objects is also solved by a test unit insertable into a test station of a test system, wherein the test unit comprises a test controller and a second data interface connected to the test controller, wherein the second data interface is connectable to a first data interface of the test system for data exchange, wherein the test controller comprises a reading device, wherein the reading device is set up in such a way that during operation of the test system it reads out an identifier which uniquely identifies a testing position of the testing station of the test system, and wherein the test controller is set up in such a way that the test controller reads out the identifier when the test unit is inserted into the testing station.

In an embodiment of the invention, the test controller is set up in such a way that it reads out the identifier automatically, i.e. without separate triggering of the read-out process by an operator. In particular, the readout is triggered automatically when the test unit is inserted into the test station.

Furthermore, the aforementioned object is also solved by a combination of a test system as described in embodiments thereof previously and a test unit as described in embodiments thereof previously. In this context, the test system may comprise all features optionally described herein, even if they are presented in combination only with the test unit. Similarly, the test unit may comprise all of the features optionally described herein, even when presented in combination only with the test system.

In an embodiment of the invention, the reading device comprises hardware elements, such as an RFID reader or a plug connector complementary to the test system plug connector, which is connected to the rest of the test controller via wires, in addition to logical elements implemented, for example, as software.

In an embodiment, the test controller is a computer. Crucially, the test controller is a separate unit from the system controller, which test controller remains in the test unit when the test unit is removed from the test station.

In an embodiment of the invention, the test controller is set up in such a way that, during operation of the test system, the test controller calculates, using the testing position encoded in the identifier, a duration which a test object requires from being detected by the test unit at the testing position until it reaches the ejection position, and the test controller gives an ejection command for the ejection device during operation of the test system and sends it to the ejection device via the first and second data interfaces and via the data transmission device so that a test object detected by the test unit is ejected by the ejection device when it reaches the ejection device.

This design of the test controller of the test unit according to the invention makes it possible for the entire test task, from the detection of the respective test object to the ejection of the test object at the point provided for this purpose, to be carried out by the test controller which is integrated into the test unit. The system controller itself, insofar as it is required at all, then only takes on coordinating and administrative tasks.

In an embodiment, the time required for a test object from a detection by the test unit at the testing position until the test object reaches the ejection position is described by an integer multiple of a processing cycle of the test system. In an embodiment, such a processing cycle is defined as the advance of the conveying device by exactly one test object received in the conveying device or by exactly one reception of the conveying device for a test object. In this way, the duration that a test object requires from being picked up by the test unit at the testing position to reaching the ejection position can be calculated by the test controller, even if there are interruptions in the conveyance of the test system.

A test unit inserted into a test station comprises information about where it is in the respective test system based on the unique identifier of the test station. The test unit takes a decision as to the ejection position at which a tested object is to be ejected and transmits the ejection command directly to the respective ejection device without the need for the system controller.

In an embodiment of the invention, the following scenario is conceivable. A test system comprising a predetermined number of test stations, a feeding device and a predetermined number of ejection devices is set up. This basic configuration is stored for each test unit that is to be used comprising this test system. When inserting such a pre-configured test unit, the test unit then knows at which testing position of the respective test system it is inserted, based on reading the identifier of the respective test station, and can take over all testing tasks independently.

For example, it is stored in the test unit in advance that there are two ejection devices at two different ejection positions, one ejection device for defective test objects and one ejection device for test objects that have successfully passed the test. After a test object has been detected, the test controller of the test unit ensures that the respective test object is ejected at the correct ejection position without involving a system controller.

In an embodiment of the invention, the system controller is arranged to transmit at least one operating parameter of the test system to the test controller of the test unit during operation of the device. In this way, in an embodiment, a pre-configuration of the test units can be omitted.

In an embodiment, the transmitted operating parameter comprises a description of the configuration of the test system. In an embodiment of the invention, the operating parameter comprises one or more ejection positions.

In an embodiment, after reading the identifier of the testing position of the test station into which the test unit has been inserted, the test unit can then autonomously derive all the information it needs to control the ejection of the respective test objects.

In an embodiment of the invention, an operating parameter transmitted from the test system to the test controller is used for calculating the duration required for a test object from being detected by the test unit at the testing position to reaching the ejection position.

Another example of an operating parameter within the meaning of the present application is the conveying speed of the conveying device.

In an embodiment of the invention, the test controller is arranged to store a plurality of pre-configurations so that a single test unit can be used flexibly in a plurality of test systems. An operator can then select a pre-configuration when inserting the test unit into the test system, or the pre-configuration is selected automatically.

In an embodiment of the invention, the identifier additionally comprises an unique information about the respective test system and/or about the configuration of the test system and/or about the ejection positions of the test system.

In an embodiment of the invention, the combination of a test system comprises several test stations at which a plurality of test units are accommodated.

In an embodiment, the test controllers of the plurality of test units are arranged in such a way that the test units can also exchange data with each other. In this way, it is possible to increase the efficiency and safety of the test system comprising a plurality of test units.

In an embodiment of the invention, a first test unit in the conveying direction of the conveying device signals to a second test unit in the conveying direction once the first test unit has detected a defective test object, so that the second test unit no longer tests this part at all. In a further embodiment, the first test unit signals to the second test unit once it has detected a test object comprising an oversize. The second test unit then retracts a probe, for example, or takes some other measure to prevent damage of the second test unit.

In an embodiment of the invention, the test controller of the test unit is arranged to eject a preselected number of test objects at a predefined ejection position so that they are subjected to a separate tolerance measurement.

In an embodiment, the test controller is arranged to also control the feeding device. In an embodiment of the invention, the test system comprises two feeding devices at two feeding positions. The test controller is arranged in such a way that the feeding positions feed reference parts into the test system at regular or random time intervals. After detection by the test unit, these reference parts are always ejected from the test system at the same ejection position in order to be able to feed them into the system again at a later time.

In an embodiment of the invention, the test controller of the test unit is arranged to eject a preselected number of test objects at a predefined ejection position in order to subject these test objects ejected there to a random sample measurement.

In an embodiment of the invention, the test system comprises a working device at a processing position, wherein preferably the processing position is located upstream of the testing position in the conveying direction, wherein the working device provides a processing or working of the object to be tested. Such processing may, for example, comprise joining two parts to form the actual test object, for example screwing a nut onto a bolt. Further examples of such a working device are an assembly device, for example for pressing or screwing additional components into or onto the test object, in particular comprising a simultaneous torque and position control and a coating device, for example for applying a coating, in particular a lubricant or a protective coating, to a cylindrical safety component.

In an embodiment of the invention, the test system is arranged to provide a clocked feed of the conveying device. In such an embodiment, the feed of the conveying device is intermittent, wherein the duration of the interruptions in the feed depends, for example, on how long a processing step in a working device takes or also how much time is required to complete a test in a test unit. In particular, it is possible to design the test system to allow for variable length work cycles.

In an embodiment of the invention, the conveying device comprises a plurality of receptacles, wherein each of the receptacles of the plurality of receptacles is arranged and located in such a way that in the receptacle in each case exactly one test object of the plurality of test objects can be conveyed along the conveying path and that in each case two test objects of the plurality of test objects comprise a distance along the conveying path which is predetermined by the plurality of receptacles. In an embodiment of the invention, all distances between each two test objects are equal.

In an embodiment of the invention, the conveying device is arranged such that the plurality of receptacles is guided along a closed path of movement, wherein the conveying path occupies a part of the path of movement. In this way, the conveying device can operate continuously, as the receptacles always return to their place of origin after a circulation.

In an embodiment of the invention, the path of movement of the plurality of receptacles comprises two straight sections, wherein at least one of the straight sections is part of the conveying path. In an embodiment of the invention, both straight sections are part of the conveying path. In an embodiment, the two straight sections of the path of movement are located opposite each other.

It is understood that in an embodiment of the invention, wherein the conveying device comprises a closed path of movement comprising two straight sections, the path of movement is arranged symmetrically, preferably mirror symmetrically with respect to a plane perpendicular to the straight sections of the path of movement and preferably rotationally symmetrically comprising a two-fold rotational symmetry.

However, it is also conceivable that the conveying device is formed by a substantially circular turntable, wherein the receptacles for the individual test objects are implemented by bores or recesses in the turntable.

In an embodiment of the invention, the plurality of receptacles for the individual test objects is arranged in such a way that a respective cylindrical safety component can be accommodated therein. Examples of such a cylindrical safety component are a screw, a pin or a bolt.

Various implementations are possible for the design of the individual receptacles. In an embodiment of the invention, each receptacle is arranged in the form of a magnetic nest. Preferably, a permanent magnet is used to hold the respective test object in the receptacle.

In an embodiment, the receptacle serves to hold or receive a cylindrical safety component comprising a head.

In an embodiment, the receptacle comprises a support surface lying in a plane and an aperture in the support surface, wherein the aperture comprises an opening towards one side of the support surface, such that a single test object can be inserted through the opening into the aperture. In an embodiment, such a receptacle is arranged in the form of a slot or elongated hole, wherein the slot is open on one side of the support surface, in order to be able to introduce the test object into the aperture of the receptacle from there.

In particular, such an embodiment is a receptacle suitable for receiving a cylindrical safety component comprising a head. The cylindrical section of the safety component is inserted through the opening into the aperture in the support surface. A bottom side of the head of the safety component rests on the support surface of the receptacle.

It is understood that a plurality of receptacles may be provided in a single support surface.

While in an embodiment of the invention the spacing between the individual receptacles is fixed, the occupancy of the receptacles may be varied. In particular, the feeding device can be controlled in such a way that only every x-th receptacle is occupied comprising a test object. In this way, the test system can be adapted to different dimensions of test objects by its controller.

In an embodiment, the occupancy of the receptacles is stored as the basic configuration of the test system in the test controller. In another embodiment, the occupancy of the receptacles is transferred as an operating parameter from the system controller to the respective test controller.

In an embodiment of the invention, each of the plurality of receptacles comprises a planar support and an aperture in the support surface, wherein preferably the aperture comprises an opening on one side of the support surface, so that one test object from the plurality of test objects can be introduced through the opening into the aperture.

In one embodiment, the support surface is movable from a first position to a second position. The possibility of moving the support surface from a first position to a second position enables, depending on the arrangement, to eject the test object from the receptacle in a simple manner or to enable the respective test object to be fed into the receptacle in a manner that is less susceptible to errors. In an embodiment of the invention, the first position of the support surface is determined by the support surface extending substantially horizontally. In this first position of the support surface, the test object is then stably received in the receptacle. If now the support surface is moved from the first position to a second, non-horizontal position, so that the test object moves in the direction of the opening, the test object, driven by gravity, will pass through the opening and fall out of the receptacle. In an embodiment of the invention, the support axis is pivotable about a pivot axis from the first position to the second position, wherein the pivot axis is parallel to a direction of movement of the receptacle along the conveying path.

In an embodiment of the invention, the support surface is transparent so that a test unit can fully detect the respective test object from only one side of the support surface.

In an embodiment of the present invention, the conveying device comprises at least one guide rail and a plurality of carriages guided on the at least one guide rail, wherein each of the plurality of carriages carries at least one of the plurality of receptacles.

While in an embodiment a single carriage comprises exactly one receptacle for exactly one test object, in another embodiment a carriage comprises a plurality of receptacles each of which carries exactly one test object.

The design of the conveying device comprising a system of guide rail and a plurality of carriages guided on the guide rail enables varying the length of the conveying path in a simple manner. Thus, the guide rail can be lengthened by adding further segments or shortened by removing segments, wherein the number of carriages accommodated on the guide rail is then also varied.

In another embodiment, the conveying device comprises a plurality of segments, wherein the straight section of the conveying path comprises an integral multiple of segments. In such an embodiment, the straight section can be flexibly adapted in its length to the testing task, in particular different numbers of test units can be accommodated on the straight section.

In an embodiment of the invention, the plurality of receptacles is guided on a closed path of movement, wherein the path of movement comprises two straight sections and two curved sections, each providing a 180° deflection. Such an embodiment has the advantage that two segments comprising curved sections of the motion path need to be provided for each system, and a flexible number of segments each comprising two straight sections of the motion path depending on the test task for which the test system is intended.

In an embodiment of the invention previously described, the test unit comprises a housing comprising a predetermined installation space, wherein the housing is detachably connectable to the conveying device so that the test unit is interchangeable with another test unit.

In an embodiment of the invention, the housing of the test unit comprises a predetermined width, wherein the straight portion of the conveying path is an integral multiple of the width, such that a plurality of test units having the same width are connectable to the conveying device.

In this way, the test system can be constructed in a modular manner, wherein, depending on the application, one or more test units with their housings can be connected to the conveying device, and wherein it is possible to exchange the individual test units.

In an embodiment of the invention, the test unit comprises at least one sensor, wherein the sensor is located such that it detects a characteristic of the plurality of test objects at the testing position. In an embodiment of the invention, the sensor is selected from a group consisting of an eddy current sensor, a probe, a conductivity sensor and a camera, or a combination thereof.

In an embodiment of the invention, the test unit is arranged to perform a test on the test object selected from a group consisting of:

a crack test, for example a test for cracks which are formed by a pressing process over the entire contour of a screw at rotational planes, a microstructure test, for example, a test for defects in material composition, for the inclusion of foreign material or for air inclusions, or a distinction between hardened and unhardened parts, an inner and outer contour test, in particular of the head of a cylindrical safety component, for example by mechanical testing for screwability and penetration depth or by evaluation via a camera system, a mechanical test for roundness, in particular of a head of a cylindrical safety component, a test for pressing faults by means of a contour probe, a straightness test, for example testing the straightness of the shaft of a cylindrical safety component by means of a measurement in three planes, an automated visual inspection comprising a camera, for example on the head of a cylindrical safety component from above, on the head of a cylindrical safety component from below, in particular for checking a sealing surface for impurities and impact points, on the head of a cylindrical safety component from the side, in particular for checking the dimensions of the head, or laterally on the shaft, in particular for checking the dimensions of the shaft, a visual inspection for the presence/absence of contours, markings, coatings, impurities and impact points, an optical inspection of the dimensions of various contours of the test object, an automated all-round visual inspection comprising a camera (360° camera inspection) and a coating inspection, e.g. the inspection of an adhesive coating, or a combination thereof, or a combination thereof.

Such measuring methods are suitable for quantitatively recording the quality of the properties of a test object, in particular a test object made of metal.

In a further embodiment, the test unit comprises a detection device connected to the test controller for detecting a distinct position at each carriage of the conveying device. For example, the distinct position at the respective carriage is its begin. In an embodiment, the detection device is a photoelectric sensor. Such an embodiment enables to determine or calibrate the working cycle of the test system by means of the test controller. The working cycle, which then forms the basis of the further control of the test system, in particular the ejection commands, is independent of any mechanical clearance of the conveying device. If the detection device detects, for example, the begin of a carriage, it knows that since the previously detected carriage, the conveying device has been advanced by a number of working cycles equal to the number of receptacles for the test objects on the carriage.

BRIEF DESCRIPTION OF THE FIGURES

Further advantages, features and possible applications of the present invention will become apparent from the following description of embodiments thereof and the accompanying figures. In the figures, equal elements are denoted by identical reference numbers.

DETAILED DESCRIPTION

Figure 1:
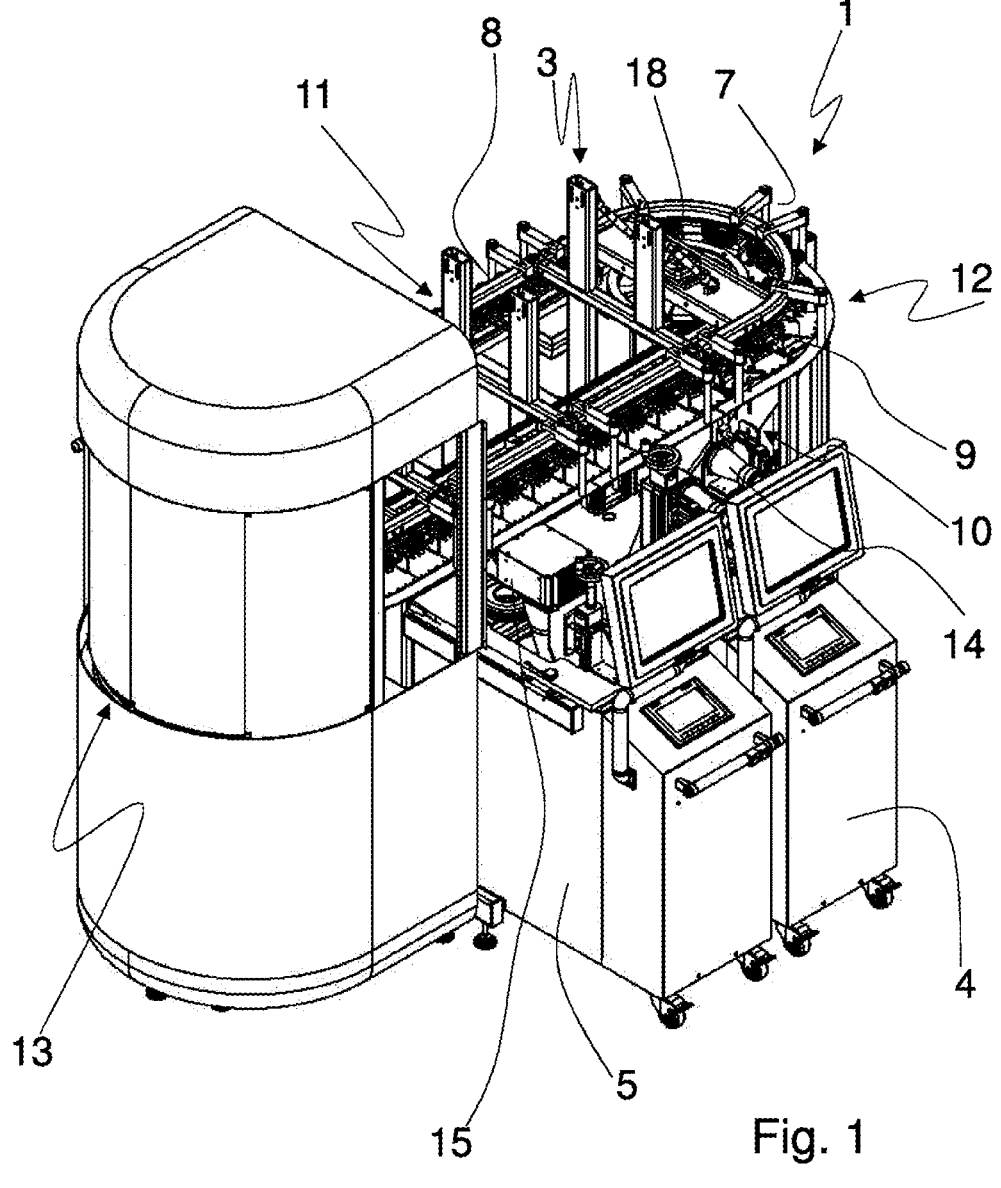
FIG. 1 is a partially broken away isometric view of a test system according to a first embodiment of the present invention.

By means of an example, a implementation of the test system according to the invention is now described. FIG. 1 shows an isometric view of the entire test system. This figure will be used repeatedly to describe the operation of the system.

The test system 1 is used for testing a plurality of screws as test objects within the meaning of the present application. Screws are supplied as bulk material and fed to the test via a feeding device. In addition to the feeding device (not shown in the figure), the test system 1 has a conveying device 3, two ejection devices and two test units 4, 5.

In the embodiment shown, the feeding device 2 is driven by gravity, i.e. the individual screws slide over a feeding slope towards the conveying device 3 due to their mass. In the feeding device, the screws are already lined up, but still in direct contact with each other, so that they are not yet separated. The screws hang on the feeding slope with their head, or the surface on the bottom side of the screw head. The conveying device 3 always picks up exactly one screw from the feeding device and conveys it along a conveying path, comprising a distance to the preceding screw and to the following screw. The conveying path is described in detail below.

For the purposes of the present application, the conveying path is the path along which the screws move between the feeding position 7, at which the feeding device is located, and the ejection device. The path along which the receptacles for the individual screws move in the conveying device 3 as a whole is referred to as the path of movement.

The conveying device 3 comprises a rail element 8 and a plurality of carriages 9 guided on this rail element 8. The path of movement of the receptacles for the screws is substantially O-shaped, comprising two straight sections 10, 11 facing each other and two curved sections 12, 13, each of which deflects the path of movement of the carriages by 180°. The two inspection units 4, 5 are located on the straight section 10 of the movement path and thus of the conveying path of the screws. The arrangement of the test units 4, 5 along the straight section of the conveying path comprises two advantages, which are explained in more detail below.

Each of the two inspection units 4, 5 has a sensor 14, 15. The sensor 14 of the first inspection unit 4 is a CCD camera for visual inspection of the individual screws. In contrast, the sensor 15 of the second test unit 5 is an eddy current measuring head for detecting cracks in the individual screws. Since the two test units 4, 5 are located along the straight section 10 of the conveying path, the distance of the individual test objects from the respective sensor 14, 15 does not change along the measuring section, which is located on the straight section of the conveying path. Therefore, artefacts that occur due to a curved measuring section caused by a changing distance between the test object and the sensor do not have to be compensated for.

The conveying device 3 is modularly constructed from a plurality of segments that are detachably and interchangeably connected to each other. The conveying device 3 shown consists of two head-side segments 16, which support the curved sections of the rail element 8. The curved sections of the rail element 8 cause a deflection of 180° in each case. Between these two head-side segments 16, two straight segments 17 are provided, which each carry two opposite straight rail sections. The straight segments 17 of the conveying device can be removed from or inserted into the test system 1 with a few simple steps. In this way, the overall length of the test system, in this case in particular the length of the straight sections of the conveying path, can be adapted on site to the respective test task. Depending on how long the straight section of the conveying path is, more or fewer test units 4, 5 can be accommodated on the straight conveying path and completely different test tasks can be carried out.

Since the two segments 17 each comprise two oppositely located straight track sections, when a straight segment 17 is added, test units can be accommodated on each of the opposite sides.

One of the curved segments 16 also carries a drive motor 18 for the carriages 9 of the conveying device 1. The individual carriages 9 are driven by a toothed belt guided over two toothed belt pulleys 19, 20. Each of the carriages 9 is suspended in the toothed belt.

Each of the carriages 9 is guided on the rail element 8, comprising rollers. The rail element 8 extends between two of the four rollers.

In the embodiment shown, each of the carriages 9 carries four receptacles 21 for exactly one screw each. Each of the receptacles 21 comprises an elongated hole as an opening within the meaning of the present application in a support surface 22. In the embodiment shown, all the elongated holes are provided in the same support surface 22. Each of the elongated holes comprises an opening towards the edge of the support surface 22, so that the screws can be inserted into the elongated hole with their cylindrical sections comprising this opening. The bottom sides of the screw heads then rest on the support surface 22.

Figures 4, 5:
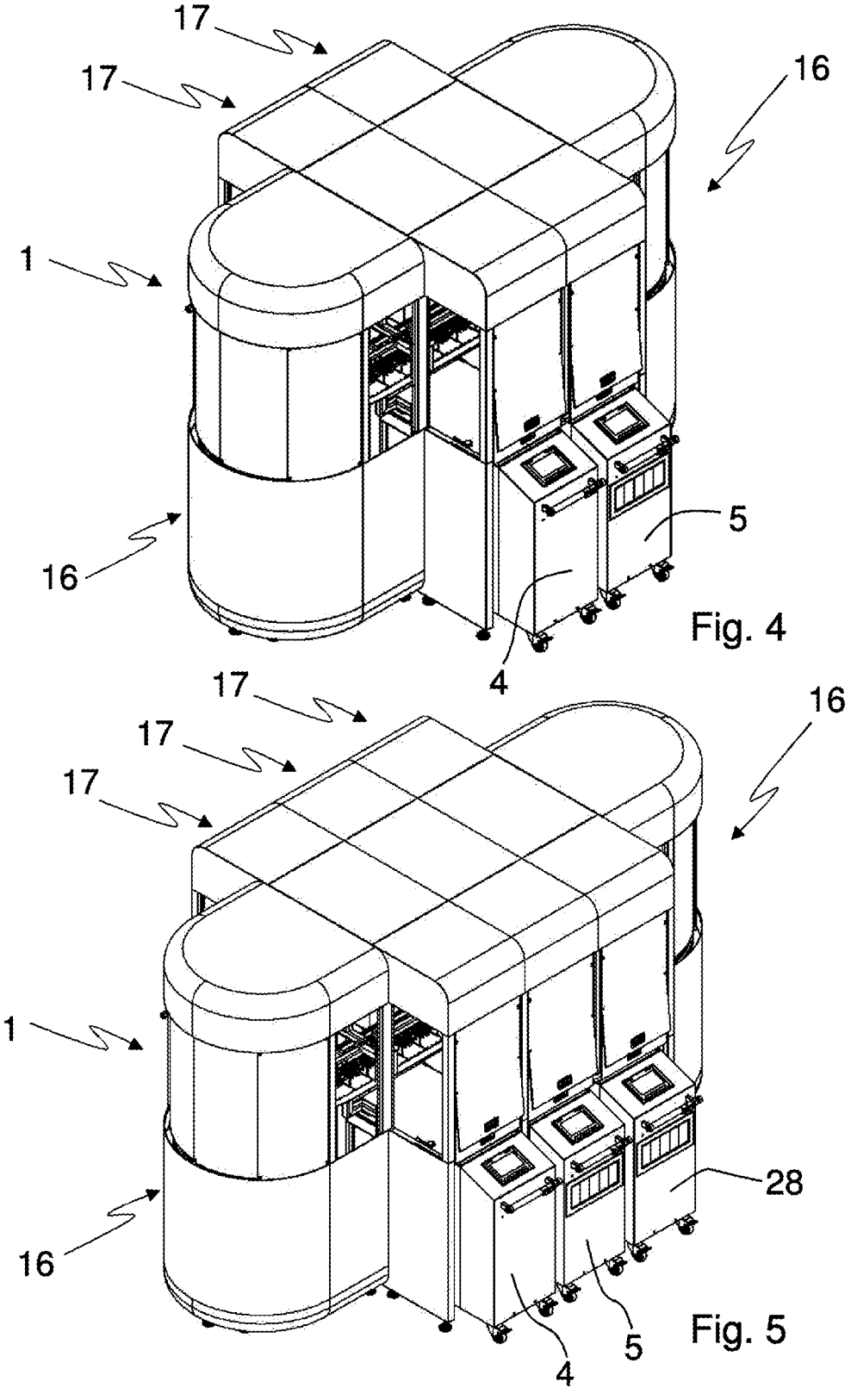
FIG. 4 is an isometric view of a test system according to a second embodiment of the present invention.
FIG. 5 is an isometric view of a test system according to a further embodiment of the present invention.

FIGS. 4 and 5 illustrate the modularity of the test system 1 according to the invention. The test system 1 shown in both FIGS. 4 and 5 is one and the same system in two configurations. In the configuration shown in FIG. 7, the system has been extended by an additional test unit 28 compared to the configuration shown in FIG. 6. In the configuration shown in FIG. 6, the test system comprises the two head-end segments 16 of the conveying device and exactly two straight segments 17. The two test units 4, 5 already shown in FIG. 1 are mounted on the two straight segments 17. In contrast, the reconfigured system shown in FIG. 7 has three straight segments 17 of the conveying device, so that the additional test unit 28 is accommodated on the third segment. Due to the modularity of the conveying device 3, the test system can be adapted to very different test requirements.

Figures 2, 3:
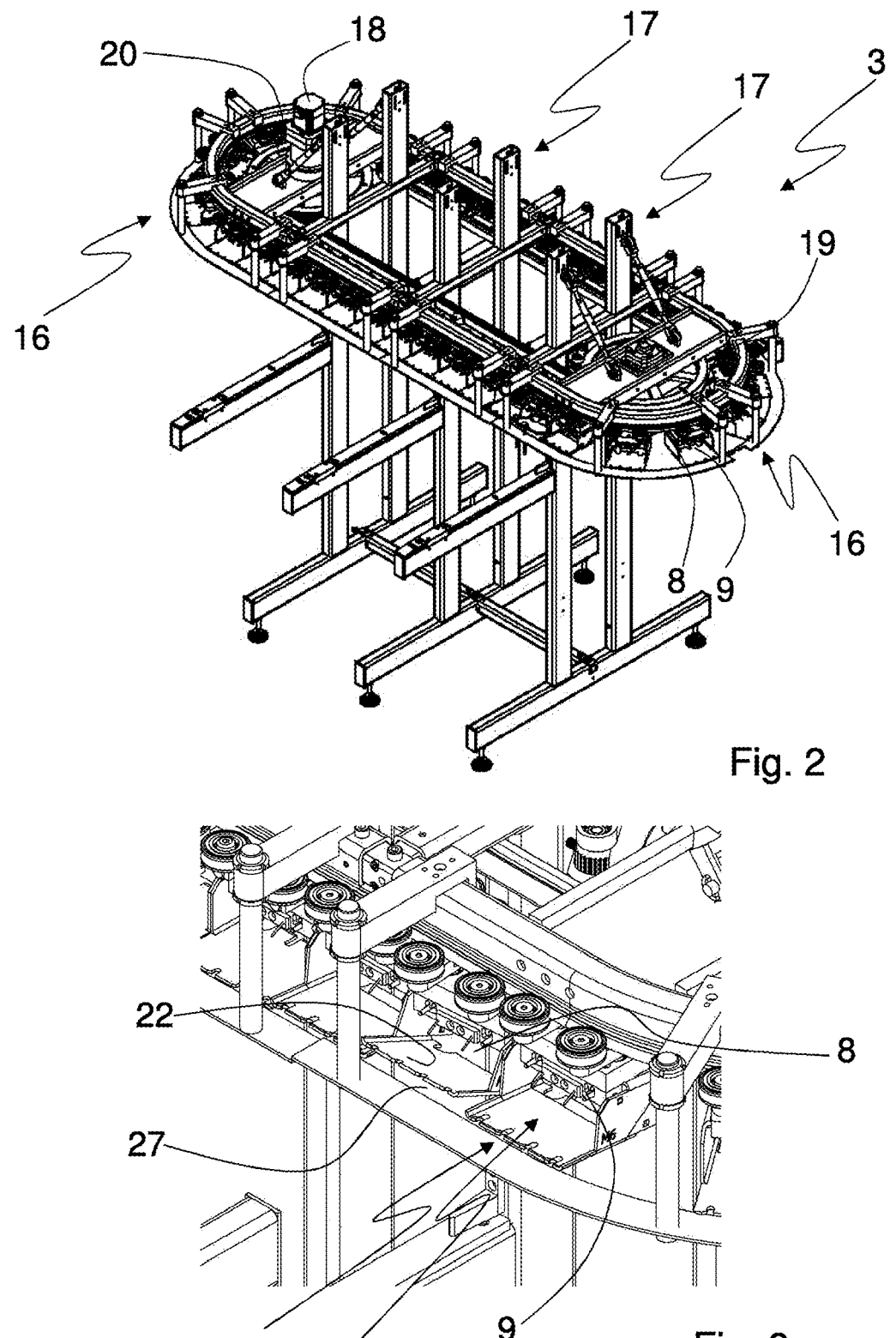
FIG. 2 is an isometric view of the conveying device of the test system of FIG. 1.
FIG. 3 is an enlarged, broken-away view of the conveying device of FIG. 2.
Figure 6:
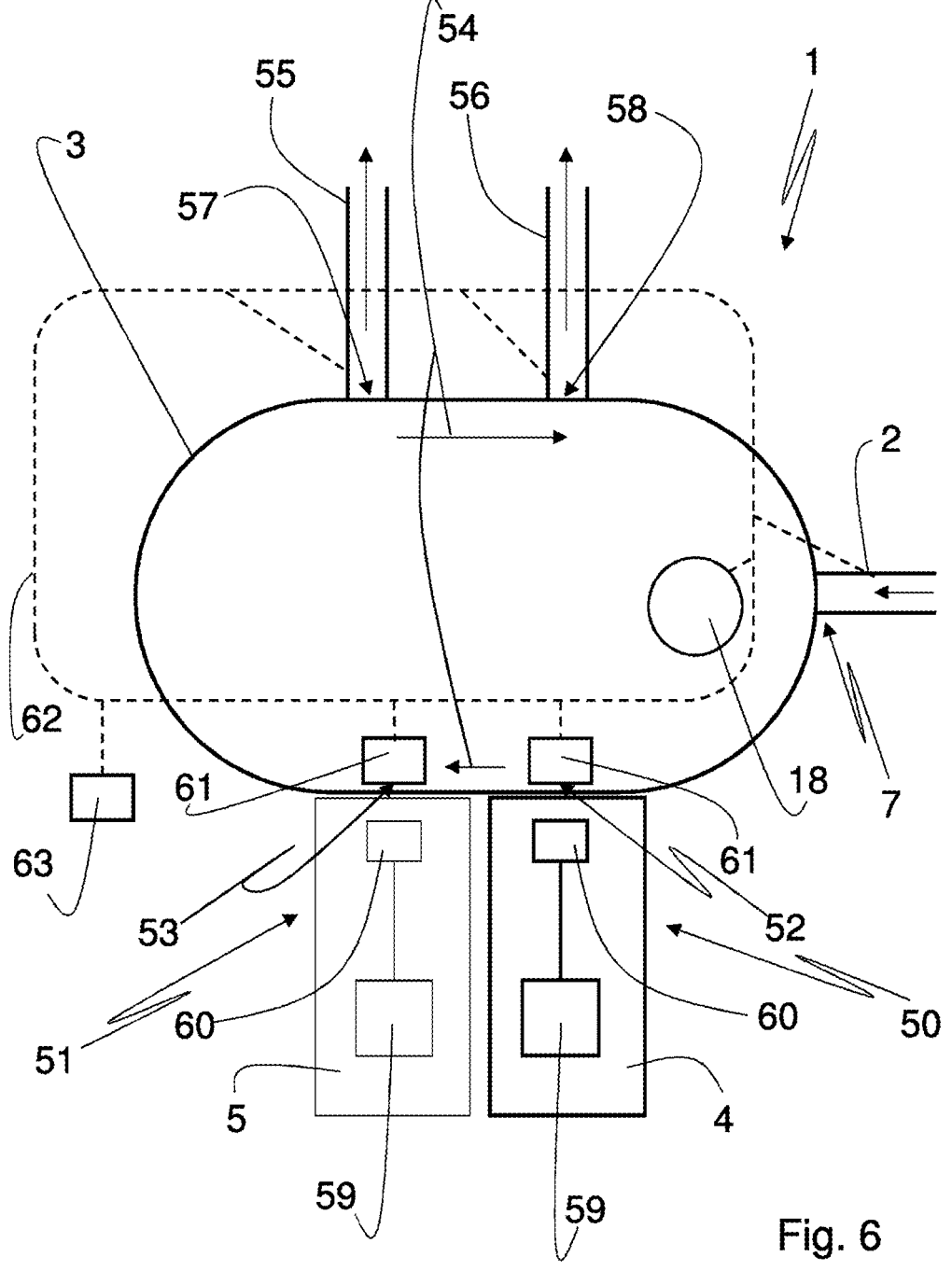
FIG. 6 is a schematic plan view of a block diagram describing the test system of FIG. 1.

FIG. 6 shows a block diagram of a top view of the test system of FIGS. 1 to 3. In addition to the mechanical components, the block diagram schematically shows the elements for the control of the test system 1.

At a feeding position 7 the feeding of the separated test objects, in this case screws, takes place as described above. The test system 1 comprises two test units 4, 5, which are located at a first test station 50 and a second test station 51 on the conveying path of the conveying device 3. The respective testing positions 52, 53 are determined by the locations 50, 51 and the design of the testing units 4, 5. The actual testing, i.e. the detection of the test objects, takes place at these testing positions. The testing positions are located downstream of the feeding position 7 as viewed in the conveying direction 54.

As explained above, the test system 1 comprises two ejection devices 55, 56, each located at an ejection position 57, 58.

The two test units 4, 5 each have a test controller 59 and a data interface 60 in the form of a plug connector. This data interface 60 is referred to as the second data interface for the purposes of the present application. When the test units 4, 5 are accommodated at the respective test station 50, 51, the plug connectors are plugged into complementary plug connectors 61 on the remaining part of the test system. These complementary plug connectors 61 form the first data interfaces within the meaning of the present application.

The first data interfaces 61 are connected to other elements of the test system comprising a bus line 62. Furthermore, a system controller 63, the ejection devices 55, 56 and the drive 18 of the conveying device 3 are connected to the bus 62.

In the embodiment shown, the system controller 63 is only responsible for fault management and administration of the system 1. In particular, the system controller 61 is responsible for controlling the drive motor 18, i.e. specifying the conveying speed.

In the embodiment shown, the system parameters such as the velocity of the test objects along the test path and the occupancy of the receptacles of the conveying device 3 are stored in advance in the test controller 59 of each test unit 4, 5. When a test unit 4, 5 is inserted for the first time at the respective testing station 50, 51, the test controller 59 detects at which testing station 50, 51 and thus at which testing position 52, 53 it is located.

For this purpose, the embodiment shown uses an identifier of the respective test station 50, 51, which is coded in the form of the pin configuration of the sockets of the plug connectors 61 of the first data interfaces.

From the testing position 52, 53, the respective test controller 59 calculates how long it takes for a test object tested by it to be conveyed from the testing position 52, 53 to the ejection position 57 or 58. In this way, the respective test controller 59 comprises all the information that enables it not only to perform the actual test, but also to implement the result of the test by ejecting the respective test object at the correct ejection position 57, 58.

In the embodiment shown, parts which have successfully passed testing comprising the two test units 4, 5 are ejected by the second ejection device 56 in the conveying direction 54. On the other hand, parts that have not passed the quality testing are ejected by the first ejection device 55.

Assuming that the first test unit 5 detects a part that has failed the test, the test controller 59 issues an ejection command directly to the first ejection device 55 via the plug connectors 60, 61 of the first and second data interfaces and the bus 60. The ejection command is generated at a time when the test object has reached this first ejection device 55.

For purposes of the original disclosure, it is pointed out that all features as they become apparent to a person skilled in the art from the present description, the drawings and the claims, even if they have been specifically described only in combination with certain further features, can be combined both individually and in any combinations with other of the features or groups of features disclosed herein, unless it has been expressly excluded or technical circumstances render such combination impossible or pointless. A comprehensive, explicit description of all conceivable combinations of features is omitted here only for the sake of brevity and readability of the description.

While the invention has been illustrated and described in detail in the drawings and the foregoing description, this illustration and description is by way of example only and is not intended to limit the scope of protection as defined by the claims. The invention is not limited to the embodiments disclosed.

Variations of the disclosed embodiments will be apparent to those skilled in the art from the drawings, description and appended claims. In the claims, the word "comprise" does not exclude other elements or steps, and the indefinite article "one" or "a" does not exclude a plurality. The mere fact that certain features are claimed in different claims does not exclude their combination. Reference numbers in the claims are not intended to limit the scope of protection.

REFERENCE NUMBERS 1 test system
2 feeding device
3 conveying device
4, 5, 28 test unit
7 feeding position
8 rail element
9 carriage
10, 11 straight section
12, 13 curved section
14, 15 sensor
16 head-end segments of the conveying device
17 straight segments of the conveying device
18 drive, drive motor
19, 20 toothed belt pulley
21 receptacle
22 support surface
50, 51 test station
52, 53 testing position
54 conveying direction
55, 56 ejection device
57, 58 ejection position
59 test controller
60 plug connector of the second data interface
61 plug connector of the first data interface
62 bus
63 system controller

The invention claimed is:

1. A test system for a plurality of test objects separable from one another comprising
a feeding device for the plurality of test objects,
a conveying device comprising a conveying path for the plurality of test objects,
a test station for inserting a test unit,
an ejection device,
a data transmission device and
a first data interface connectable to the test unit,
wherein the feeding device is arranged and located in such a way that, during operation of the test system, the plurality of test objects is feedable to the conveying device by means of the feeding device at a feeding position,
wherein the test station is located at a testing position on the conveying path in a conveying direction downstream of the feeding position,
wherein the test station is arranged such that the test unit is interchangeably connectable with the test station,
wherein the ejection device is located on the conveying path in the conveying direction downstream of the testing position at an ejection position and is arranged in such a way that, during operation of the test system, at least one of the plurality of test objects is ejectable from the conveying device by means of the ejection device, and
wherein the data transmission device for transmission of information is operatively connected at least to the ejection device and to the first data interface, and
an identifier uniquely identifying the testing position, wherein the identifier is coded in such a way that the identifier is readable by the test unit when the test unit is inserted into the test station.

2. The test system according to claim 1, wherein the identifier is encoded in an identifier device located at the test station and readable by the test unit.

3. The test system according to claim 1, wherein the identifier is formed by a plug connector which is located at the test station, wherein the plug connector preferably comprises a plurality of contact pins or contact sockets and wherein the arrangement of the contact pins or contact sockets present and/or connected to a connecting line encodes the identifier.

4. The test system according to claim 1, wherein the first data interface comprises a plug connector located at the test station, wherein the plug connector of the first data interface is connectable to a complementary plug connector of the test unit.

5. The test system according to claim 4, wherein the identifier is coded as an IP address of the first data interface.

6. The test system according to claim 1, wherein the first data interface is a wireless interface.

7. The test system according to claim 1, further comprising:

an ejection station, and an identifier uniquely identifying the ejection position, wherein the ejection station is arranged such that the ejection device is interchangeably inserted into the ejection station, wherein a first data interface is provided at the ejection station, which first data interface is connected to a second data interface of the ejection device, wherein said data transmission device is operatively connected to said ejecting device for transmitting information via said first data interface and said second data interface, wherein the identifier is encoded such that the identifier is readable by the ejection device upon insertion of the ejection device into the ejection station; and wherein the ejection device comprises a reading device for reading the identifier.

8. The test system according to claim 1, wherein the test system comprises a system controller connected to the data transmission device.

9. The test system according to claim 1, further comprising a test unit, wherein the test unit is inserted into the test system at the test station, wherein the test unit comprises:

a test controller and a second data interface comprising the test controller, wherein the second data interface is connectable to a first data interface of the test system for data exchange, wherein the test controller comprises a reading device, wherein the reading device is set up in such a way that, during operation of the test system, the reading device reads out an identifier which uniquely identifies a testing position of the test station of the test system, and wherein the test controller is set up in such a way that the test controller reads out the identifier when the test unit is inserted into the test station.

10. The test system according to claim 9, wherein the test controller is set up in such a way that the test controller calculates, during operation of the test system using the testing position coded in the identifier, a duration required by a test object from detection by the test unit at the testing position to reaching the ejection position, and the test controller issues an ejection command for the ejection device during operation of the test system and sends it to the ejection device via the first and second data interfaces and via the data transmission device, so that a test object detected by the test unit is ejected by the ejection device when the test object reaches the ejection device.

11. The test system according to claim 9, wherein the system controller is set up in such a way that it transmits at least one operating parameter of the test system to the test controller during operation of the test system.

12. A test unit insertable into a test station of a test system, comprising a test controller and a second data interface comprising the test controller, wherein the second data interface is connectable to a first data interface of the test system for data exchange, wherein the test controller comprises a reading device, wherein the reading device is set up in such a way that, during operation of the test system, the reading device reads out an identifier which uniquely identifies a testing position of the test station of the test system, and wherein the test controller is set up in such a way that the test controller reads out the identifier when the test unit is inserted into the test station.

* * * * *